United States Patent [19]

Hwang

[11] Patent Number: 4,543,568
[45] Date of Patent: Sep. 24, 1985

[54] BURGLAR ALARM WITH RE-ENTRY FEATURE

[76] Inventor: Shih M. Hwang, P.O. Box 7-369, Taipei City, 106, Taiwan

[21] Appl. No.: 480,124

[22] Filed: Mar. 29, 1983

[51] Int. Cl.$^4$ .............................................. G08B 23/00
[52] U.S. Cl. .................... 340/528; 340/523; 340/527; 340/542; 340/64; 340/309.15; 307/10 AT
[58] Field of Search ............... 340/528, 527, 529, 500, 340/506, 63, 64, 65, 521, 523, 309.15, 309.3, 542, 540, 541; 307/10 AT; 180/173, 287

[56] References Cited

U.S. PATENT DOCUMENTS

| | | | |
|---|---|---|---|
| 3,710,317 | 1/1973 | Colsen et al. | 340/64 |
| 3,829,829 | 8/1974 | Teich | 340/64 |
| 3,858,175 | 12/1974 | Kopera, Jr. | 340/63 |
| 3,967,239 | 6/1976 | Steele | 340/63 |
| 4,114,147 | 9/1978 | Hile | 340/528 |
| 4,151,507 | 4/1979 | Willis | 340/65 |
| 4,187,496 | 2/1980 | Kovens et al. | 340/63 |
| 4,297,674 | 10/1981 | Merten | 340/63 |

Primary Examiner—Donnie L. Crosland
Attorney, Agent, or Firm—Cushman, Darby & Cushman

[57] ABSTRACT

An "Automatic Exit Delay" circuit of a burglar alarm is placed on Stand-By whenever a "first" door is opened and the burglar alarm automatically starts to work right after the "last" door is closed. At that moment of arming a "Quiet Quick Test" Network automatically tests the alarm for proper functioning and generates a short "beep" to indicate such as well as the armed state of the alarm system.

12 Claims, 2 Drawing Figures

BURGLAR ALARM WITH RE-ENTRY FEATURE

SUMMARY OF THE INVENTION

This invention discloses A.E.D. (Automatic Exit Delay) and Q.Q.T. (Quiet Quick Test) features for a superior innovative burglar alarm method and apparatus using NC (normally closed) and/or NO (normally open) INPUT as input connections for sensors installed at, for example, doors, hood, trunk lid, etc.

Referring to FIG. 1, once an ING. KEY SWITCH is opened, it arms the circuit outputs, it causes "Hi" signals to reset the IC2 and subsequently the Siren Output Network. When the engine is stopped (i.e., ING. KEY SWITCH off), the A.E.D. circuit remains off. Once a "first" door is opened, the A.E.D. circuit is in a STAND-BY mode, and thereafter automatically starts to work right after the "last" door is closed. At that time, the Q.Q.T. Network will "beep" to show that the circuit is normal, and that doors, hood, and trunk lid are safely closed.

The "beeping" sound serves as a good test and audio feedback to the user, and the Q.Q.T. will automatically let timer T1 (formed by the time constant of R4 and C2) start to time exit delay. If the door or hood or trunk lid is opened again, IC2 will be reset and returned to its original STAND-BY mode. Since timer T1 does not continue to time at this moment, the Siren Output Network will not be able to work.

Once the "last" door is closed again, the Q.Q.T. circuit will "beep" once again to indicate that doors are all closed and let timer T1 (R4 and C2) start to time the exit delay.

After the T1's exit delay timing is completed, the IGN. KEY SWITCH circuit will be locked out (i.e., the alarm will not be reset by the IGN. KEY SWITCH). Then, when any door is opened, signals so indicating will be latched and timer T2 will be started to time. Within the period in which T2 times a delay, the user can remove (i.e., prevent) triggering signals to the alarm by using the external key switch. However, any would-be burglar will not be able to open the outside key switch within such short time in which T2 times the delay of only several seconds. Even if the IGN. KEY SWITCH is opened, a burglar would still not be able to reset the alarm. Once T2's timing is finished, the alarm sounds loudly. Furthermore, if a burglar opens the hood or trunk lid, the alarm is immediately triggered. Hence, this device offer an effective prevention to attempted burglary.

Exemplary embodiments of this invention are discussed in detail with reference to the following figures, in which:

FIG. 1 is a practical example of application of this invention to an automobile burglar alarm; and FIG. 2 is an application of this invention to other kinds of burglar alarms.

DETAILED DESCRIPTION OF THIS INVENTION

Figure 1:
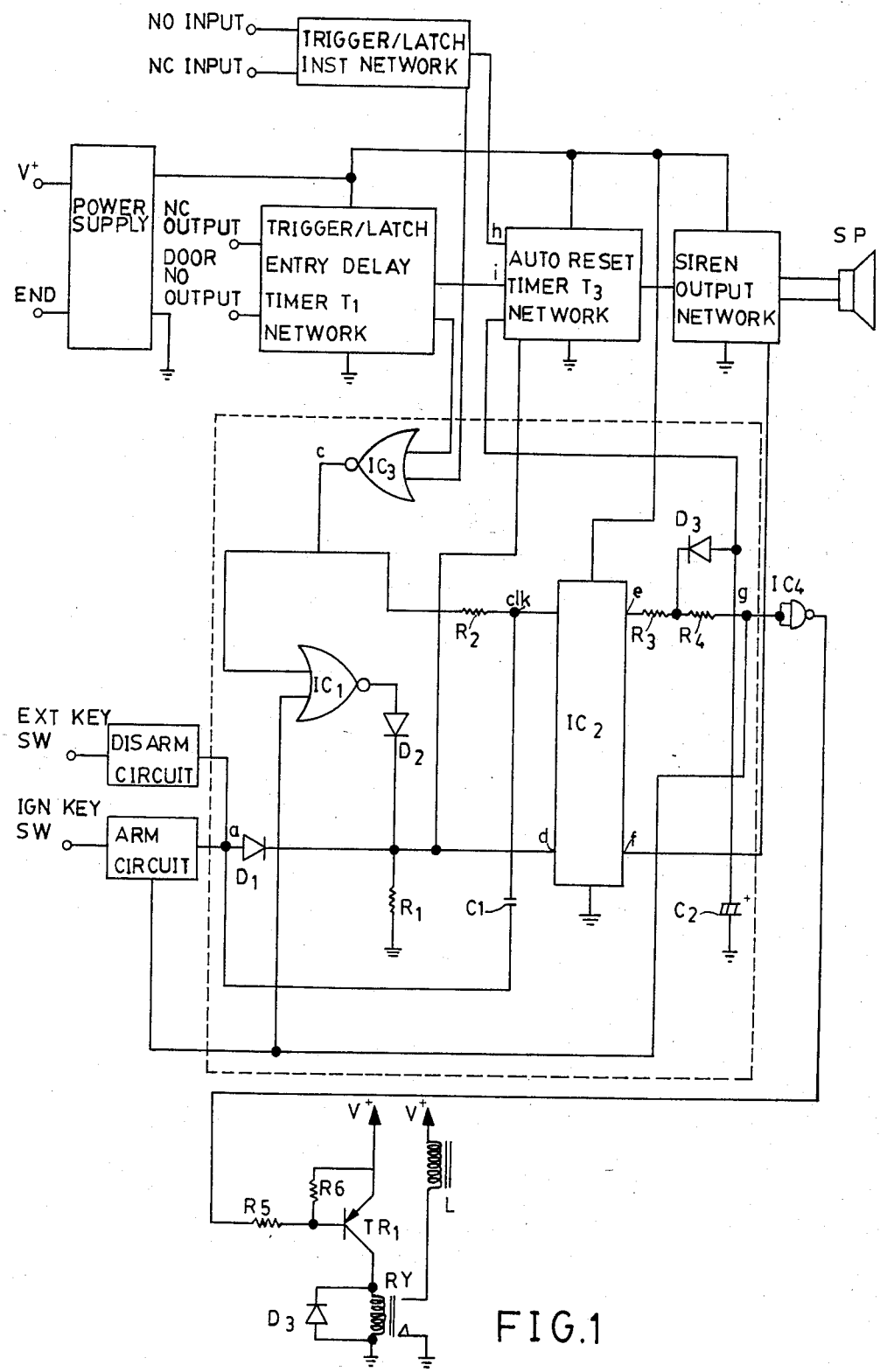

With the present high rate of burglaries in society, the most effective, economical, and practical way to prevent being burglarized or robbed is to install a burglar-proof alarm. However, conventional burglarproof alarms often fail to work when a burglar breaks in. Thus, users regard many burglarproof alarms as unreliable.

Several factors combine to form some reasons why conventional burglar alarms fail in their desired effect: the user forgot to switch on the power switch of the alarm so that it will work, or the user continued attempted use of the alarm when the alarm was malfunctioning.

Automobile burglar alarms can be classified into manual/active and passive/automatic. Reasons why these two types of burglar alarms fail to achieve effectiveness are as follows. Disadvantages of manual/active burglar alarms: (1) Its switch must be turned to an "ON" position whenever the user leaves the car. However, the user often forgets to do this, so the alarm is left in an "OFF" position when he leaves the car. (2) Without a device to test the burglar alarm or simply without doing such a test, the user will not be able to know whether the burglar alarm or its circuit is malfunctioning. (3) Once the burglar alarm switch is on, a circuit starts a time delay of limited duration. Therefore, the user must leave the car quickly after the switch is turned to the "ON" position. This is inconvenient or perhaps impossible if the user or a person in the car is old or handicapped in any way. Moreover, there is no way to make sure if a door is properly closed or if all connections are good. (4) When it comes to testing the burglar alarm, the user is often unwilling or unable to do so because the noise caused by the testing will disturb others or cause other difficulties.

Though passive/automatic burglar alarm system can automatically be armed after a key to an engine ignition is taken out, it automatically times the exit period. Some advantages are as follows: (1) The allowable time to leave the car is very short; generally it is 20–40 seconds. This is even a shorter delayed exit time than that of manual/active burglar alarms. If the user fails to leave the car and close the door properly right after the engine ignition key is taken out, and if too many passengers or too much baggage must be removed from the car, the alarm will sound after the timing has reached the designated period of 20–40 seconds. (2) The passive/automatic system also possesses as disadvantages the items (2), (3), and (4) discussed above for the manual/active burglar alarm systems. (3) If a user needs to re-open a door because he left something in the car, this will trigger the alarming system. (4) Without a time delay device, the user might mistakenly disconnect the alarm by failing to exit within the exit time. These are common disadvantages that conventional burglar alarms possess, whether installed in homes, ships, or automobiles, etc.

The present invention uses features for automatic switch on, automatic exit, delay, and automatic quiet quick test to thereby permit its applicability to any kind of burglar alarm. With its application to automobile burglar alarms as an example, when the automobile is stopped with its IGN. KEY SWITCH off or key taken out, the user can stay in the car without time limit so long as the door is not opened. Whenever a "first" door is opened, an A.E.D. circuit will automatically shift to a STAND-BY mode. Whenever a "second" door is opened when all passengers get out of the car and the "last" door is closed, the Q.Q.T. circuit will automatically "beep" to indicate that the alarm is on alert, exit timing is operative, that all the doors are properly closed and that the circuits are in good order (i.e., no malfunction). These are four major functions of the method and apparatus of this invention.

With use of an exit delay circuit T1, this invention will reset (i.e., restart) T1's timing within about 20 seconds of T1's initial start-up of timing (started after the "last door" is closed) if any doors or the hood and trunk lid need to be opened so as to get something. Thus, the alarm will not be triggered.

After T1's timing, the alarm will be immediately triggered once the hood or trunk lid is opened. However, if the user need to open doors during timing period T2 (generally about 10–15 seconds), he can use the key to an external key switch to reset the latched alarming signal. It's absolutely impossible for burglars to open the outside key switch within the time period T2. Therefore, a more reliable and effective prevention of burglary is achieved. An exemplary embodiment of this invention can be applied to an automobile, as will be illustrated with the following discussion.

The necessary Power Supply Network for meeting present circuitry requirements will not be detailed here since such is well-known.

Trigger/Latch and Entry Delay Time (T2) Network has an NC (normally closed) Input and an NO (normally open) Input for input of signals from sensors or switches. These sensors can be of any suitable type, such as fine tuning supersonic wave or microwave, or infrared. One or more than one kind of such sensors can be combined for installation doors, etc., to sense their opened or closed state. Entry Delay Timer (T1) is also a portion of this network.

The Trigger/Latch INST Network includes NO (normally open) and NC (normally closed) Inputs. NO Input signals may be for sensors installed in a hood or trunk lid. NC Input signal wires may be connected with the chassis of a car stereo. The Auto Reset Timer (T3) Network can automatically stop sounding an alarm after T3's timing is completed.

The Siren Output Network generates the siren sound, or it can also be modified to generate other kinds of alarming sounds. The Disarm Circuit is controlled by an ignition key switch.

The theory of operation of this invention is as follows.

FIG. 1 shows the working features of the A.E.D. and Q.Q.T. network. For this circuit, point "C" is "Hi" when the doors, hood and trunk lid are properly closed. Point "A" is "Hi" whenever the ignition key switch is turned to "ON". Hence, IC2 is reset whenever the ignition key switch is "ON" and point "A" is "Hi". Then, the point "F" output goes "Hi" to reset the Siren Output Network. Whenever the car is stopped (i.e., the ignition key switch is "OFF") with all doors closed, the point "C" output is "Hi" to let CLK of IC2 be "Hi". At this moment, IC1 will provide point D with positive electric potential so as to reset IC2. If the "first" door is opened at this moment, point "C" becomes "Lo". Then, with the IC1 input at "0,0", it outputs "1" (Hi) to reset IC2.

When the "last" door is closed, the Q.Q.T. Network will beep. Its signal, from the last NC Input or NO Input to IC2, will make point "C" become "Hi", and thus also point "D" of IC2. The short "beep" produced by the Q.Q.T. Network is used to indicate whether the whole system is armed. This is an "automatic" test to indicate whether doors are properly closed and whether all networks are properly functioning. If the trunk lid, for example, is not properly closed, the Q.Q.T. network will fail to beep.

When the alarm is armed, point "e" of IC2 is "Hi". This causes T1's automatic timing to be started based on R4's and C2's combined time constant. T1 is the exit delay timer; if doors or hood and trunk lid are re-opened during T1's timing period, point "d" becomes "Hi" so as to reset IC2.

Once T1's timing is completed, point "g" becomes "Hi" so as to result the Arm CKT of the ignition key switch. With such reset, point "a" will not be converted into "Hi" when the ignition key switch is opened (i.e., when turned to "ON"). At the same time, Auto Reset Timer CKT is provided with the "Hi" of point "g". If the door is opened at this moment, the Trigger/Latch Entry Delay Timer (T2) Network starts to time T2 and point "c" also will be "Lo" so as to make CLK of IC2 be "Lo". However, IC1 will not be able to reset IC2 because the IC1 inputs are "1,0" and thus its output is "0" (i.e., "Lo"). If the hood or trunk lid is opened, the results are the same. If only the door is opened, T2 will not time but will cause the alarm to sound immediately.

If the door or hood or trunk lid is opened while T1 is timing, IC2 will be reset. But, if the door or hood or trunk lid is opened after T1's timing is completed, the alarm will be triggered.

To close the alarm, the external key switch may be used to reset the IC2 and hence the Siren Output Network. The burglar will not be able to open the external key switch during the short several seconds of T2's timing. Therefore, he (or she) will trigger the alarming system. Furthermore, even if the burglar can open the IGN. KEY SWITCH within the period of T2's timing, the alarm will still be triggered. Therefore, effectiveness in preventing burglary can be achieved.

Point "G" of FIG. 1 is connected to IC4. Its signal passes through R5 and TR1 after it is out of phase. When point "g" is "hi", TR1 will act to short the relay and thereby break the ignition coil so that the engine will not be started. This is a double (i.e., backup) function which prevents the car from being burglarized even if the burglar has successfully turned on the engine switch.

Figure 2:
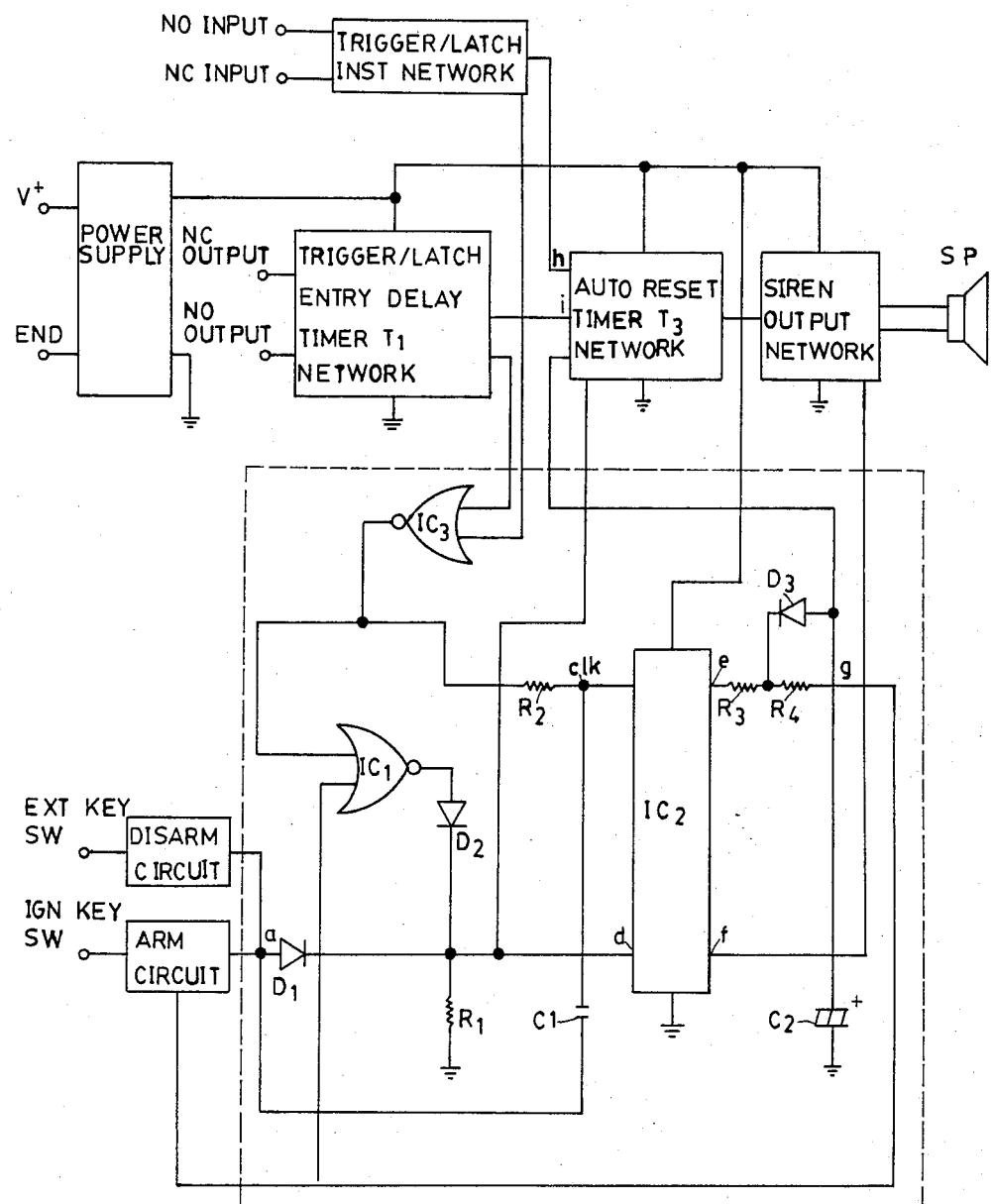

FIG. 2 discloses an embodiment for the application of this invention to other kinds of burglar alarms. If this invention is installed as a burglar alarm on a ship, its installation is identical to the FIG. 1 discussion. When this invention is installed as a burglar alarm for a household, shop or industry, the NO and NC Inputs of Trigger/Latch, Entry Delay Timer (T2) Network can be installed at doors, and the NO or NC Input of Trigger/Latch, INST Network can be installed at windows, the door of a safe or in smoke detectors. The IGN. KEY SWITCH can then be used as power supply switch, and the External Key Switch can be used as the switch to close the alarm. This kind of layout has the same effect as that of the automobile embodiment of the burglar alarm.

The Automatic Reset Timer (T3) Network of this invention starts to time T3 (generally about several scores of seconds to several minutes), whenever it is provided with "Hi" Signals by point "i" of Trigger/Latch and Entry Delay Network or simultaneously by points "h" and "g" of the Trigger/Latch and INST Network. This automatically resets the Siren Output Network to prevent wasted power consumption and excessive noise both caused by extended sounding of the siren.

Automatic Reset Timer (T3) can be reset if the external key switch is opened so as to make point "d" be "Hi". Trigger/Latch, Entry Delay Network and Trigger/Latch, INST Network of this invention can be installed as necessary for the particular application. Their NO and NC Inputs may be from various sensor, such as fine tuning, supersonic wave or microwave sensor, infrared sensors, or fire prevention, gas-prevention-smoke-detectors, etc. One or more of the above-said sensors can be used as the input for particular installations.

I claim:

1. A method of operating an alarm system for an enclosure having a plurality of closable entrances, comprising the steps of:
   sensing the removal of a key from a key switch;
   monitoring the opening and closing of said entrances;
   detecting the subsequent closing of all entrances opened after the sensing of said key removal; and
   upon such detection, arming said alarm system and indicating such arming and such detection with an audible tone.

2. A method as in claim 1, further comprising the steps of:
   starting a timing period T1 whenever said system is armed;
   resetting said timing period T1 if it has not elapsed and one of said entrances is opened.

3. A method as in claim 2, further comprising the steps of:
   sounding an alarm after a predetermined time delay T2 if any of said entrances are opened after the timing period T1 has elapsed or if certain ones of said entrances are opened before T1 has elapsed.

4. A method as in claim 3, wherein said sounding step includes a step of interrupting said sounding of said alarm if a reset switch is actuated before said predetermined time delay T2 elapses.

5. A method as in claim 4, wherein said timing period T1 is within a range of 20-40 seconds and said predetermined time delay T2 is within a range of 10-15 seconds.

6. A method as in claim 5, wherein said enclosure is an automobile, said entrances comprise doors, a hood and trunk lid of said automobile and said certain ones of said entrances comprise said hood and trunk lid.

7. An alarm system for an enclosure having a plurality of closable entrances, comprising:
   sensing means for sensing the removal of a key from a key switch of said enclosure;
   monitoring means for monitoring opening and closing of said entrances;
   detecting means for detecting opening and subsequent closing of said entrances after sensing of said key removal;
   arming means, responsive to said detecting means, for arming said alarm system and subsequently outputting an audible tone as an indication of both said arming and said detecting of said opening and subsequent closing of said entrances.

8. An alarm system as in claim 7, wherein said arming means comprises:
   timing period means for starting a timing period T1 whenever said alarm system is armed, and
   resetting means for resetting said timing period means if said timing period T1 has not elapsed whenever said monitoring means detects opening of one of said entrances.

9. An alarm system as in claim 8, further including:
   alarm sounding means for sounding an alarm after a predetermined time delay T2 whenever said monitoring means monitors opening of any of said entrances after said timing period T1 has elapsed or opening of certain ones of said entrances before said timing period T1 has elapsed.

10. An alarm system as in claim 9, wherein said alarm sounding means further includes a reset switch and means for preventing said sounding of said alarm if said reset switch is actuated before said predetermined time delay T2 has elapsed.

11. An alarm system as in claim 10, wherein said timing period T1 is within a range of 20-40 seconds and said predetermined time delay T2 is within a range of 10-15 seconds.

12. An alarm system as in claim 11, wherein said enclosure comprises an automobile, said entrances comprise doors, a hood and trunk lid of said automobile and said certain ones of said entrances comprise said hood and said trunk lid.

* * * * *